United States Patent Office.

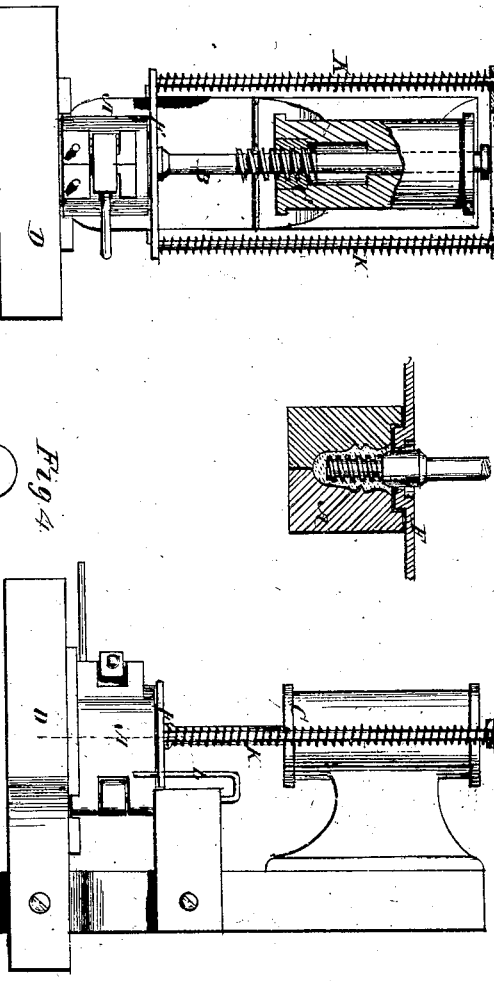

JAMES M. BROOKFIELD, OF BROOKLYN, NEW YORK.

Letters Patent No. 103,555, dated May 31, 1870.

IMPROVED MODE OF FORMING INSULATORS.

The Schedule referred to in these Letters Patent and making part of the same.

*To all whom it may concern:*

Be it known that I, JAMES M. BROOKFIELD, of Brooklyn, Kings county, and State of New York, have invented a new and improved Mode of Forming Glass Insulators; and I do hereby declare that the following is a full, clear, and exact description thereof, which will enable others skilled in the art to make and use the same, reference being had to the accompanying drawing forming part of this specification.

My invention relates to glass insulators, and consists in an article of improved form, and also in certain improvements in machinery by which the article is made, as will be specified more particularly hereinafter.

The invention also comprises the combination with the former of a follower, for pressing down into the top of the mold, to prevent the overflow of the glass, and to give form to the bottom of the insulator.

Figure 1 represents a front elevation, partly in section, of a machine, showing one arrangement of means for operating the former;

Figure 2 is a side elevation of the same;

Figure 3 is a section through the mold and follower, showing the former when screwed into the glass; and Figure 4 is a plan view of the molds used for giving the exterior shape to the insulators and holding the glass while the action of the former is taking place.

Similar letters of reference indicate corresponding parts.

These glass insulators are now formed, in respect to their exterior shape, and with smooth sockets, by placing the molten glass in the two-part hinged flasks or molds A, and forcing a smooth former into the molten glass from the top, the said molds being open thereat, and charged with a sufficient quantity for one insulator by pouring it in at the said opening.

I now propose to form the screw-threads by which the insulators are screwed onto the supporting studs, at the same time the exterior shape is produced and the socket formed, by means of a screw-threaded mandrel, B, arranged in a suitable screw-threaded support, C, and with suitable means for screwing it down into and onto the glass, while in the mold and under the former, either wholly forming the socket by the screw-threaded former, or first partially forming the same by a smooth former or plunger, pressed into the glass, and to this end I provide a table, D, for the mold A, a support, C, for the former, with screw-threads of the same pitch as those on the former, and so arranged, relatively to the table, that the mold may be placed under it, to receive it in the center of the glass, while the latter is in a plastic state.

The follower is allowed to remain until the glass solidifies, and is then withdrawn.

I also provide, as one means of turning the former, a crank, E, on the top of the shaft of the former, or in another arrangement I place a bevel-wheel on the said shaft, and gear with it another and larger bevel-wheel, on a horizontal shaft, provided with a driving-crank.

F is a follower, suspended by a bar, G, from the shaft of the former, at the upper end by rods H, capable of sliding up and down in the bar G, and having adjustable nuts, I, to limit their downward movement.

They also have springs K, arranged to press the follower down.

When the former is up, the follower will be raised by the bar G and rods sufficiently to allow the molds A to be moved under the former, and, when the latter is screwed down a short distance, the follower will assume the position on the molds represented in fig. 3, to resist the tendency of the glass to flow upward as the follower continues to screw into it, the springs, at the same time, pressing down thereon, and their force increasing as the follower goes down.

L represents guides for the follower.

This prevents the glass from being forced over the top of the mold, and gives shape to the bottom of the insulator.

Having thus described my invention,

I claim as new and desire to secure by Letters Patent—

1. The combination of divided die A, constructed internally as shown in fig. 3 of drawing, with a mandrel, B, threaded on its lower end as described, so that the insulator will be threaded in its center, while the divided die will allow of its removal, notwithstanding its irregular external form.

2. The combination of divided die A, constructed internally as described, and the end-threaded mandrel B, with the follower F that presses upon the plastic glass and forms the bottom of the insulator, in the manner described.

JAMES M. BROOKFIELD.

Witnesses:
GEO. W. MABEE,
ALEX. F. ROBERTS.